Nov. 28, 1933.  E. H. ALLEN  1,937,214
SAFETY DEVICE FOR SEMITRAILERS
Filed May 22, 1933
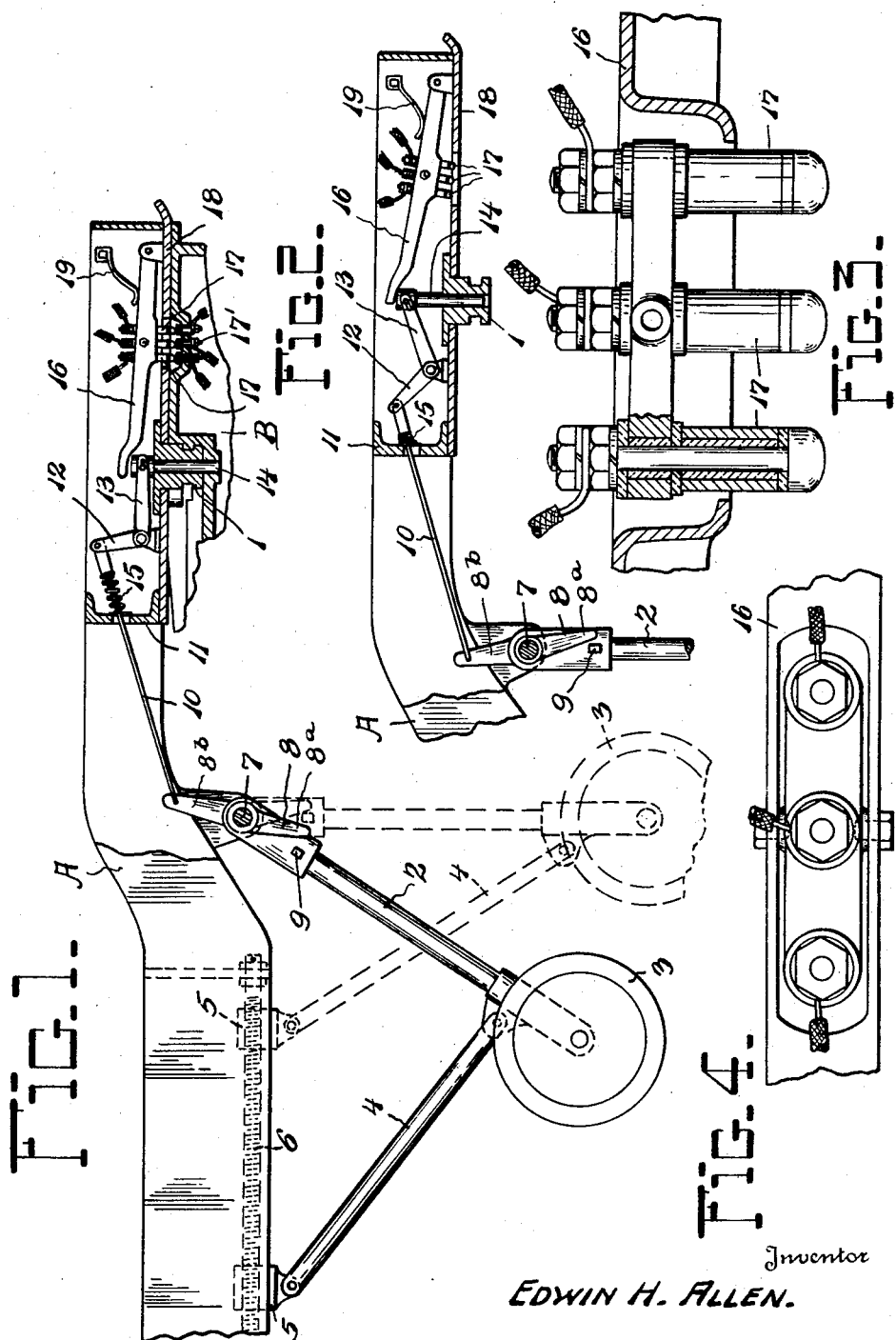
Inventor
EDWIN H. ALLEN.
By Robert Robb
Attorneys Patented Nov. 28, 1933

1,937,214

UNITED STATES PATENT OFFICE 1,937,214

SAFETY DEVICE FOR SEMITRAILERS

Edwin Howe Allen, Edgerton, Wis., assignor to Highway Trailer Company, Edgerton, Wis., a corporation Application May 22, 1933. Serial No. 672,307

9 Claims. (Cl. 280—33.1)

In the art of semitrailer vehicles, which vehicles are usually known as the pay load vehicles of six wheel tractor-trailer combination vehicles, the semitrailer is equipped with electric signal lights. Suitable circuit wires and contacts are mounted on the trailer to cooperate with contacts on the tractor, or tractor fifth wheel so that when the four wheel tractor vehicle is coupled to the two wheel trailer vehicle electric current may be supplied to the circuits of the trailer which include the signal lights.

When the tractor and trailer vehicles are uncoupled, it is necessary, of course, to disconnect the contact means between the two.

The present invention makes provision of special contact means on the trailer, movable into and out of cooperation with the contact means on the tractor, in making and breaking the circuit, and connecting the signals on the trailer with the electric current supply means on the tractor.

Semitrailers are equipped with movable supports mounted on the front portions thereof to support the front end of the trailer when it is disconnected from the tractor.

The present invention makes provision for a combinative action between the support for the front end of a trailer, and the electric contact means for the signal circuit of the said trailer, whereby when the said support is moved downwardly to an operative position to carry the front end of the trailer whilst the tractor vehicle is disconnected therefrom, interconnections will be automatically operated by such movement of the said support so as to actuate the contact members carried by the trailer and move said contact members into an inoperative position. Likewise the said interconnections are susceptible of operation automatically so that when the support for the front end of the trailer is elevated to an inoperative position, said interconnections will move or automatically adjust themselves to permit the contact means on the trailer to assume an operative relation in reference to the contact means on the tractor vehicle or fifth wheel, which, of course, will be engaged with the front end of the trailer before the said support is raised. This latter action is necessary because the weight of the front end of the trailer must be taken off of the movable support at such end before said support is relieved of its functions to carry said front end of the trailer.

According to some constructions of tractor-trailer combination vehicles, a safety connection is provided between the tractor and trailer fifth wheels involving the use of a locking or connecting pin controlled by the front supports of the vehicle and operated by said front supports when they are down in their effective positions, whereby to release the connection established by the safety pin and permit separation of the said tractor and trailer fifth wheels. Thereafter, an operation of the front support for the trailer to carry it to its travelling or inactive position likewise controls the movement of the safety pin to restore the latter to its position for locking the fifth wheels together independently of the regular latch devices that are mounted on the tractor fifth wheel and customarily engaged with the king pin on the trailer. The present invention relating to the signalling appliances may or may not be used in conjunction with the safety pin locking means above referred to.

In the drawing:—

Fig. 1 is a fragmentary view of the front end portion of a known type of semi-trailer, the frame broken away, and the invention illustrated in connection therewith.

Fig. 2 is a view similar to Fig. 1, omitting the illustration of the support and showing the essential operating parts of Fig. 1 in the positions assumed thereby when the trailer contacts are illustrated or placed in inoperative positions.

Fig. 3 is a fragmentary sectional view of the switch or contact bearing lever showing more clearly the mounting of the electrical contact devices.

Fig. 4 is a fragmentary top plan view showing primarily the parts of Fig. 3.

In the accompanying drawing, A denotes the frame of a known type of semitrailer, the rear end of the frame A being carried by ground wheels not illustrated, and the front end of the frame being equipped with a king pin 1 dependent therefrom and adapted to establish a coupling connection with a fifth wheel carried by the rear end of a four wheel tractor vehicle, such as a truck, or any suitable motor propelled machine of this type. The trailer frame A is equipped with the usual hand operated support 2 provided with the small supporting wheels 3 to enable the trailer to be moved when the support 2 is operative, and said support 2 is moved to and from its operative positions by any suitable manual means. The manual means is partially illustrated as the link 4, connected to the lower end of the support 2, a threaded nut 5 on the operating screw shaft 6, said shaft being adapted to be turned by a handle or any other suitable means to move the nut 5 and thus raise and lower the support 2.

The support 2 is carried by a horizontal axis member 7 upon which is also mounted an actuating lever 8, comprising the arms 8a and 8b, the lever arm 8a being in the path of movement of an abutment member 9 near the upper end of the support 2. The lever arm 8b is connected by a rod 10 passing through a cross channel 11 of the frame A and attached to the upper end of the vertical arm 12 of a bell crank lever, the lower arm 13 of which is attached to a safety pin 14 operating in the king pin 1.

A compressible spring 15 normally has expansion action to move the lever 12 and pin 14 into the position shown in Figure 1. The upper end of the pin 14 is beneath and adapted to abut with the free end portion of a contact supporting lever 16. This lever 16 pivotally supports the several contacts 17 adapted to move upwardly and downwardly through an opening in the bottom plate 18 at the front end of the frame A. Normally, a spring 19 tends to push down on the lever 16 to carry the contacts 17 downwardly, through the frame plate 18, and into an operative position to engage with cooperating contacts 17' upon the tractor vehicle fifth wheel in a well known manner, preferably embedded or recessed in the lower fifth wheel and being arcuate in form to permit continuous and unbroken contact of the contact members when the same are in operative position throughout the normal relative horizontal swing of the vehicles as in going around curves.

The foregoing being understood to be the construction of the various parts used in my invention, I now set forth the operation thereof. Assuming that the parts are in the full line positions of Figure 1, it is evident that the contacts 17 are at their downward adjustment or limit of movement. The parts in the positions of Figure 1 are operative as when the tractor vehicle is coupled to the trailer frame A by means of the king pin 1. Supposing now that the tractor vehicle is to be uncoupled, the first operation, of course, is the lowering of the support 2 by the manually operated means 5 and 6. Such operation brings the support 2 to the full line position of Figure 2, and causes the abutment 9 to engage the lever arm 8a to cause the lever 8 to assume the position shown in Figure 2.

The action of the lever 8 exerts a pull on the rod 10 compressing the spring 15 and rocking the lever 12—13 in such a way as to lift the pin 14. Lifting of the pin 14 rocks the contact supporting lever 16 upwards as shown in Figure 2 thereby raising the contacts 17 into their inoperative position so that these contacts are separated from and out of the way of the contact members on the tractor fifth wheel when the said fifth wheel moves from beneath the front end of the frame A in uncoupling it from the king pin 1 in a manner well known to those versed in the art. Later, upon the recoupling of the tractor vehicle with the king pin 1 and trailer frame A, the elevation of the support 2, manually, relieves the lever 8 of the pressure of the abutment 9, whereupon the spring 15 and the spring 19 together carry the parts 12—13 and 16—17 together with the pin 14 back to the operative positions shown in Figure 1.

Usually certain lock members upon the lower fifth wheel B of the tractor engage with the king pin 1 on the trailer to thus connect the trailer fifth wheel and king pin with the tractor fifth wheel, independently of the safety pin 14, after the manner illustrated in Martin et al. Patent No. 1,412,025, April 4, 1922. Since the connecting pin 14 is not necessarily used upon trailers, it is obvious that the levers 12—13 and 16 are adapted to coact one with the other even when the body of the connecting pin 14 is not employed as a safety member and is therefore omitted.

Having thus described my invention, what I claim as new and desire to secure by Letters Patent of the United States, is:—

1. In a trailer vehicle of the class described, a trailer frame, a temporary support for the front end of said frame when the trailer is disconnected from its tractor vehicle, said support being movable to operative and inoperative positions, a contact device mounted on the trailer frame for cooperation with a corresponding contact device carried by a tractor vehicle, and mechanism operable by said support for rendering the said contact device operative and inoperative according to the particular adjustment of the support.

2. In a trailer vehicle of the class described, a trailer frame, a ground engaging support for the front end of the frame movable thereon to operative and inoperative positions, and electrical circuit closing contact means on the trailer frame movable to operative and inoperative positions by the said support.

3. In a trailer vehicle of the class described, a trailer frame, a temporary ground engaging support mounted on the trailer frame to support same when disconnected from a tractor vehicle but movable to non-supporting position, signal connecting devices carried by the trailer frame and connections between the signal connecting devices and said support actuating said signal connecting devices by the movement of the support.

4. In a trailer vehicle of the class described, in combination, a trailer frame, a coupling king pin thereon, a safety pin mounted in the said coupling king pin, a temporary support for the front end of the trailer frame, a contact device mounted on the trailer frame and movable to and from operative position, together with connecting means operable by the said support to actuate said safety pin, and a lever connected with said contact device and operable by the safety pin whereby movement of the said support to and from operative position controls adjustment of the said contact device to and from operative position.

5. In a trailer vehicle of the class described, in combination, a trailer frame, a support for the front end of said frame movable to operative and inoperative positions, a coupling king pin carried by said trailer frame, a safety pin movable in said king pin, linkage and lever means operable by the support and connected with the safety pin, an electrical contact device, a lever carrying said contact device to move same to and from operative positions, said lever cooperative with the safety pin to be moved thereby on movement of the safety pin, and spring means for acuating said linkage and lever parts upon adjustment of the support to an inoperative position.

6. In a trailer vehicle of the class described, in combination, a trailer frame, a support for the front end of the said frame movable to operative and inoperative positions, a coupling king pin carried by said trailer frame, a safety pin movable in said king pin, linkage and lever means operable by the support and connected with the safety pin, an electrical contact device, a lever carrying said contact device to move same to and from operative positions, said lever cooperative with the safety pin to be moved thereby on movement of the safety pin, and spring means for actuating said linkage and lever parts upon adjustment of the support to an inoperative position, the said support being equipped with an abutment cooperative with said first mentioned linkage and leverage support for moving the latter and the safety pin in a direction opposite to its movement under the influence of the spring means.

7. In a trailer vehicle of the class described, a trailer frame, a support for the front end of the frame movable thereon to operative and inoperative positions, and a movable automatic electric contact switch on said frame constituting means for establishing electric connections with a cooperating tractor vehicle part, with interconnections between the support and said switch actuating the latter by the support.

8. In a trailer vehicle of the class described, a trailer frame, a support for the front end of the frame movable thereon to operative and inoperative or traveling positions, and a movable automatic electric contact switch on said frame constituting means for establishing electric connections with a cooperating tractor vehicle part, with interconnections between the support and said switch actuating the latter by the support, said interconnections automatically permitting movement of the switch to its operative contact connecting position when the support is raised to a travelling position.

9. In a trailer vehicle of the class described, a trailer frame, a ground engaging support for the front end of the frame movable thereon to operative and inoperative positions, and electrical circuit closing contact means on the trailer frame movable to operative and inoperative positions by the said support, the movement of said contact means to inoperative position being effected approximately at the end of the movement of said support to operative position.

EDWIN HOWE ALLEN.